(12) United States Patent
Trimmer et al.

(10) Patent No.: US 8,281,066 B1
(45) Date of Patent: Oct. 2, 2012

(54) SYSTEM AND METHOD FOR REAL-TIME DEDUPLICATION UTILIZING AN ELECTRONIC STORAGE MEDIUM

(75) Inventors: Don Trimmer, Sunnyvale, CA (US); Steven C. Miller, Livermore, CA (US)

(73) Assignee: NetApp, Inc., Sunnyvale, CA (US)

( * ) Notice: Subject to any disclaimer, the term of this patent is extended or adjusted under 35 U.S.C. 154(b) by 304 days.

(21) Appl. No.: 12/754,162

(22) Filed: Apr. 5, 2010

Related U.S. Application Data (60) Provisional application No. 61/174,314, filed on Apr. 30, 2009.

(51) Int. Cl.
*G06F 12/06* (2006.01)
*G06F 7/32* (2006.01)

(52) U.S. Cl. .................. 711/103; 711/154; 711/E12.01; 711/E12.008

(58) Field of Classification Search .................. 711/103, 711/154, 161, E12.008, E12.01, E12.103
See application file for complete search history.

(56) References Cited

U.S. PATENT DOCUMENTS

| | | | | |
|---|---|---|---|---|
| 7,369,432 | B2 * | 5/2008 | Berenbaum et al. | 365/185.01 |
| 7,567,188 | B1 * | 7/2009 | Anglin et al. | 341/63 |
| 2004/0003189 | A1 * | 1/2004 | England et al. | 711/156 |
| 2004/0017303 | A1 * | 1/2004 | Loewen | 341/98 |
| 2006/0133560 | A1 * | 6/2006 | Takagi | 377/82 |
| 2008/0184001 | A1 * | 7/2008 | Stager | 711/167 |
| 2008/0294696 | A1 * | 11/2008 | Frandzel | 707/200 |
| 2009/0013129 | A1 * | 1/2009 | Bondurant | 711/115 |
| 2009/0259877 | A1 * | 10/2009 | Vyssotski et al. | 713/502 |
| 2009/0265399 | A1 * | 10/2009 | Cannon et al. | 707/205 |
| 2009/0313418 | A1 * | 12/2009 | Ross | 711/103 |
| 2010/0306283 | A1 * | 12/2010 | Johnson et al. | 707/803 |

OTHER PUBLICATIONS

Gal, et al., "Algorithms and Data Structures for Flash Memories", ACM Computing Surveys, vol. 37, No. 2, Jun. 2005, pp. 138-163.
Trimmer, et al., "System and Method for Real-Time Deduplication Utilizing an Electronic Storage Medium", U.S. Appl. No. 61/174,314, filed Apr. 30, 2009, 28 pages.
Trimmer, et al. "Method for Maintaining a Hash Table in Flash Memory", U.S. Appl. No. 11/863,024, filed Sep. 27, 2007, 31 pages.

* cited by examiner

*Primary Examiner* — Hal Schnee
(74) *Attorney, Agent, or Firm* — Cesari and McKenna, LLP (57) ABSTRACT

The present invention provides a system and method for eliminating duplicate data (de-duplication) in substantially real time using an electronic storage medium.

17 Claims, 7 Drawing Sheets

SYSTEM AND METHOD FOR REAL-TIME DEDUPLICATION UTILIZING AN ELECTRONIC STORAGE MEDIUM

RELATED APPLICATION

The present invention claims priority from U.S. Provisional Application Ser. No. 61/174,314, filed on Apr. 30, 2009 for SYSTEM AND METHOD FOR REAL-TIME DEDUPLICATION UTILIZING AN ELECTRONIC STORAGE MEDIUM, by Don Trimmer, et al., the contents of which are incorporated herein by reference.

FIELD OF THE INVENTION

The present invention relates generally to data storage compression and, more specifically, to the elimination of duplicate data (de-duplication) using an electronic storage medium.

BACKGROUND OF THE INVENTION

A storage system typically comprises one or more storage devices into which information may be entered, and from which information may be obtained, as desired. The is storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic medium storage device. The term disk in this context is synonymous with hard disk drive (HDD) or direct access storage device (DASD).

Archival data storage is a central part of many industries that operate in compliance and/or regulated environments, e.g., banks, government facilities/contractors, securities brokerages, etc. In many of these environments, it is necessary to store selected data, e.g., electronic-mail messages, financial documents and/or transaction records, in an immutable manner, possibly for long periods of time. Typically, data backup operations are performed to ensure the protection and restoration of such data in the event of a failure. However, backup operations often result in the duplication of data on backup storage resources, such as disks and/or tape, causing inefficient consumption of the storage space on the resources.

One form of long term archival storage is the storage of data on magnetic tape medium. A noted disadvantage of physical tape medium is the slow data access rate and the added requirements for managing a large number of physical tapes. In response to these noted disadvantages, several storage system vendors provide storage systems configured as virtual tape library (VTL) systems that emulate tape storage devices using a is plurality of disk drives. In typical VTL environments, the storage system serving as the primary storage performs a complete backup operation of the storage system's file system (or other data store) to the VTL system. Multiple complete backups may occur over time thereby resulting in an inefficient consumption of storage space on the VTL system. This may occur due to, e.g., identical data appearing in a plurality of backups, thereby resulting in the same data being stored in a plurality of locations (e.g., data blocks) on the VTL system. It is thus desirable to eliminate duplicate data (de-duplication) on the storage resources, such as disks associated with a VTL system, and ensure the storage of only single instance of data to thereby achieve storage compression.

Conventional de-duplication systems typically require that the data is first written to disk and then, at a later point in time, the data is de-duplicated. This typically arises because the de-duplication system cannot process the data at sufficient speeds to enable real-time de-duplication of a new incoming data set, e.g., a tape backup stream. A noted disadvantage of such conventional de-duplication systems is that the VTL system requires sufficient space to write the entire data set prior to de-duplication, thereby eliminating any space savings from de-duplication.

SUMMARY OF THE INVENTION

The present invention overcomes the disadvantages of the prior art by providing a system and method for eliminating duplicate data (de-duplication) using an electronic storage medium. In operation, a signature database and a block reference count data structure (e.g., a file) are stored on the electronic storage medium, such as a solid-state device within a storage system. The signature database maintains information about signatures (e.g., hashes) of data previously stored in data blocks on the storage system. The block reference count file maintains a count of the number of times a particular stored data block is referenced. That is, the block reference count file tracks the number of times that a particular block of data is referenced by de-duplicated data containers of the various data sets within the storage system. By storing these data structures in an electronic storage medium, access times are significantly improved over storage on a magnetic storage medium. Further, by managing the signature database and block reference count file in the electronic storage medium in accordance with the novel techniques of the is present invention, the de-duplication system may perform operations at substantially real-time speed, thereby obviating the need for first storing the data prior to de-duplication.

Illustratively, a new data set, e.g., a backup data stream, is received by the storage system, e.g., a virtual tape library (VTL) system, implementing the invention, which chunks (divides) the data set into one or more data blocks. Illustratively, the blocks are of a predetermined fixed size, e.g., 32 KB and a signature is generated of each block by, e.g., hashing the contents of the block. A determination is then made whether the generated signature has been stored previously in the signature database. If the signature has been stored in the signature database, the block is replaced in the data set with a pointer to the previously stored block. A counter in the block reference count file is then incremented. The block reference count file maintains an entry comprising a bit field and a counter for each of the blocks within the storage system. When a new reference to a particular block is added, the lowest clear bit within the bit field is asserted, e.g., set, in the entry associated with the block. Similarly, when a block is de-referenced, the highest clear bit of the bit field is set.

Should either of these operations set the last clear bit within the bit field, a repack operation is performed. The repack operation reads all entries within a region of the electronic storage medium. The counters are updated based on the recorded number of new references and/or de-references in the bit fields before the bit fields are cleared. The entries are then rewritten to the electronic storage medium. By utilizing a bit field counter with repack operations as necessary, the number of times that a particular region of an electronic storage medium needs to be rewritten is reduced, thereby increasing the life of the electronic storage medium.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
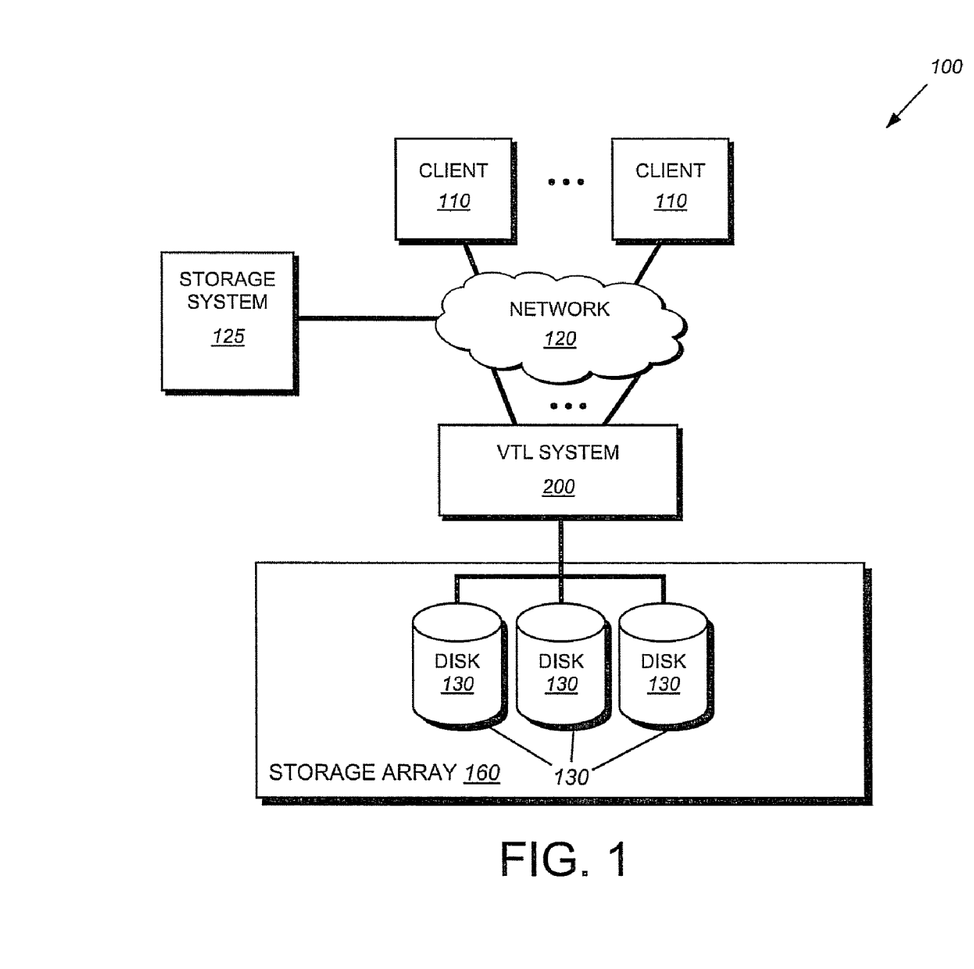
FIG. 1 is a schematic block diagram of a storage system environment including a is virtual tape library (VTL) system in accordance with an illustrative embodiment of the present invention.

FIG. 1 is a schematic block diagram of a storage system environment 100 that may be advantageously used in accordance with an illustrative embodiment of the present invention. The storage system environment 100 comprises a storage system 125 interconnected with a plurality of clients 110 by network 120. Illustratively, the network 120 may be embodied as an Ethernet network or a Fibre Channel (FC) network. Also interconnected with the network 120 is a storage system configured as a virtual tape library (VTL) system 200 that illustratively implements the novel real time data de-duplication technique of the present invention. Also operatively connected with the VTL system 200 is are one or more storage devices, such as disks 130, organized as a storage array 160.

In operation, the storage system 125 services data access requests from the clients 110. Each client 110 may be a general-purpose computer configured to execute applications and interact with the storage system 125 in accordance with a client/server model of information delivery. That is, the client may request the services of the storage system, and the system may return the results of the services requested by the client, by exchanging packets over the network 120. The clients may issue packets including file-based access protocols, such as the Common Internet File System (CIFS) protocol or Network File System (NFS) protocol, over TCP/IP when accessing information, such as data, in the form of data containers, such as files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of data containers, such as blocks.

When an administrator of the storage system 125 desires to perform a backup operation, conventional tape backup software (not shown) may be utilized on the storage system 125 to perform a backup operation to the VTL system 200. The VTL system 200 appears to the storage system 125 as a remote tape drive; thus, the storage system 125 may perform a conventional tape backup operation to the VTL system 200 using conventional tape backup software. Typically, each backup operation results in the copying of the entire file system stored by the storage system 125 to the VTL system 200, e.g., as a "backup". A noted result of such copying is that the VTL system 200 may include significant amounts of duplicated data, i.e., data that remains common among each of the backups of storage system 125 and/or redundant data between backups of different clients 110. The present invention illustratively eliminates duplicate data using a substantially real time de-duplication technique, described further below, that utilizes data structures stored in an electronic storage medium, thereby enabling de-duplication to occur in substantially real time with no need for first storing the data and then performing a deis duplication operation on the previously stored data. This significantly reduces the total amount of storage that is needed on a VTL system as the data does not need to be stored in its original state prior to de-duplication. Instead, a data stream may be de-duplicated in substantially real time as the data stream enters the VTL system. Thus, the present invention enables de-duplication to occur at substantially line speed, i.e., the speed at which the data stream is being transmitted over the network.

B. Virtual Tape Library System

Figure 2:
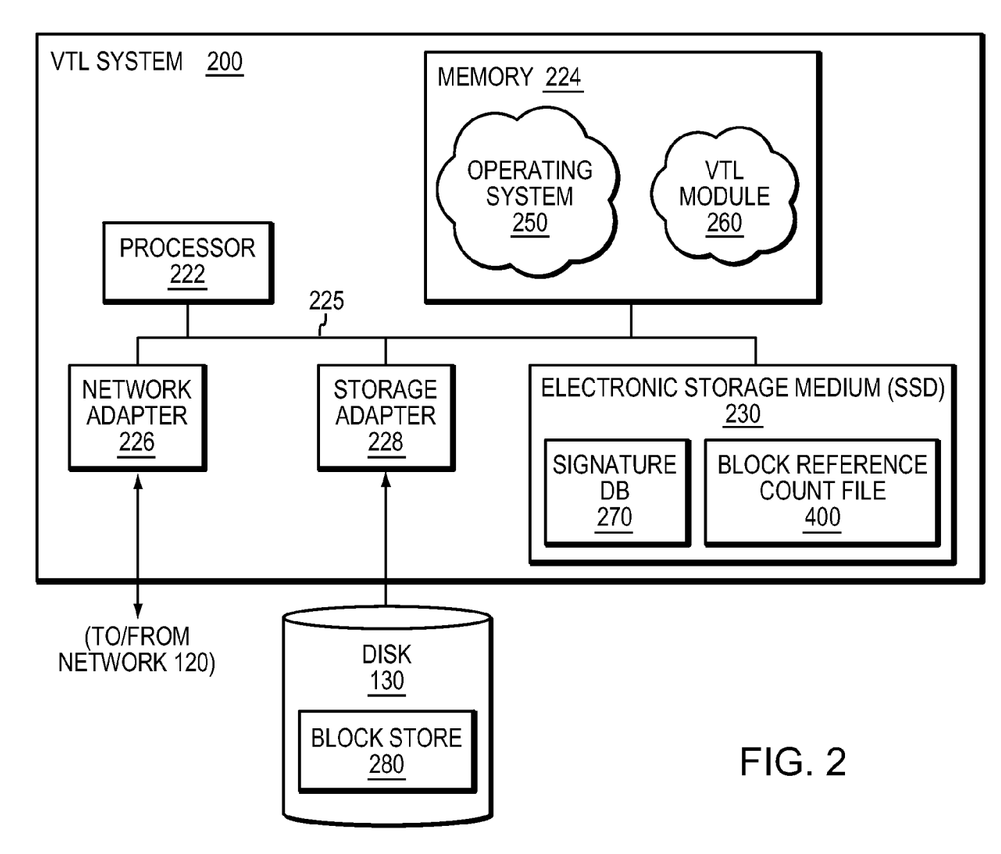
FIG. 2 is a schematic block diagram of a VTL system in accordance with an illustrative embodiment of the present invention.

FIG. 2 is a schematic block diagram of a VTL system 200 that may be advantageously used in accordance with an illustrative embodiment of the present invention. Illustratively, the VTL system 200 is a computer that provides storage service relating to the organization of information on storage devices, such as disks 130. The VTL system 200 illustratively comprises a processor 222, a memory 224, one or more network adapters 226, one or more storage adapters 228 and an electronic storage medium 230 interconnected by a system bus 225. Each network adapter 226 comprises the mechanical, electrical and signaling circuitry needed to connect the VTL system 200 to storage system 125 over the network 120. The electronic storage medium 230 may comprise, e.g., a solid state device (SSD), such as flash memory. In alternative embodiments, the electronic storage medium may comprise battery backed-up non-volatile random access memory (NVRAM). As such, the description of electronic storage medium 230 comprising flash memory should be taken as exemplary only.

The VTL system 200 also includes an operating system 250 that interacts with various modules, such as virtual tape library (VTL) module 260, described further below. The operating system 250 may implement a logical data object store on disks 130 and/or the electronic storage medium 230 for use by applications, such as VTL module 260 executing on the VTL system 200.

In the illustrative embodiment, the memory 224 comprises storage locations that are addressable by the processor and adapters for storing computer software program code, such as operating system 250 and VTL module 260 as well as various data structures. The processor and adapters may, in turn, comprise processing elements and/or logic circuitry configured to execute the computer code and manipulate the data structures. It will be apparent to those skilled in the art that other processing and memory means, including various computer readable medium, may be used for storing and executing program instructions of the computer code pertaining to the inventive technique described herein.

The storage adapter 228 cooperates with the operating system 250 executing on the VTL system 200 to store and retrieve information requested on any type of attached array of writable storage device medium such as video tape, optical, DVD, magnetic tape, bubble memory, electronic random access memory, micro-electro mechanical and any other similar medium adapted to store information, including data and parity information. However, as illustratively described herein, the information is preferably stored on the disks 130, such as HDD and/or DASD. The storage adapter 228 includes input/output (I/O) interface circuitry that couples to the disks over an I/O interconnect arrangement, such as a conventional high-performance, FC serial link topology.

As noted, the operating system 250 illustratively implements a logical data object store on disks 130 and/or the electronic storage medium 230. It should be also noted that in alternative embodiments, other forms of data organization may be utilized including, for example, a file system. As such, the description of utilizing a logical data object store should be taken as exemplary only. Furthermore, the VTL module 260 cooperates with the operating system 250 to implement virtual tape library functionality for the VTL system 200. In an illustrative embodiment, the VTL module implements the logical data object store as a block store 280 on storage devices 130. The block store 280 is utilized to store de-duplicated data in accordance with an illustrative embodiment of the present invention. In accordance with such an illustrative embodiment, the VTL module 260 maintains a signature database 270 and a block reference count data structure, e.g., a file 400, in electronic storage medium 230. Illustratively, the signature database 270 stores previously identified signatures of blocks for fast lookup and retrieval to compare with signatures of blocks in an incoming data stream. The signature database 270 may be implemented as a hash table. Furthermore, the hash table may be illustratively implemented using the technique described in U.S. patent application Ser. No. 11/863,024, entitled METHOD FOR MAINTAINING A HASH TABLE IN FLASH MEMORY, by Donald Trimmer, et al., the contents of which are hereby incorporated by reference. It should be noted that the signature database may be implemented using techniques other than a hash table. As such, the description of the signature database being implemented as a hash table should be taken as exemplary only.

Figure 4:
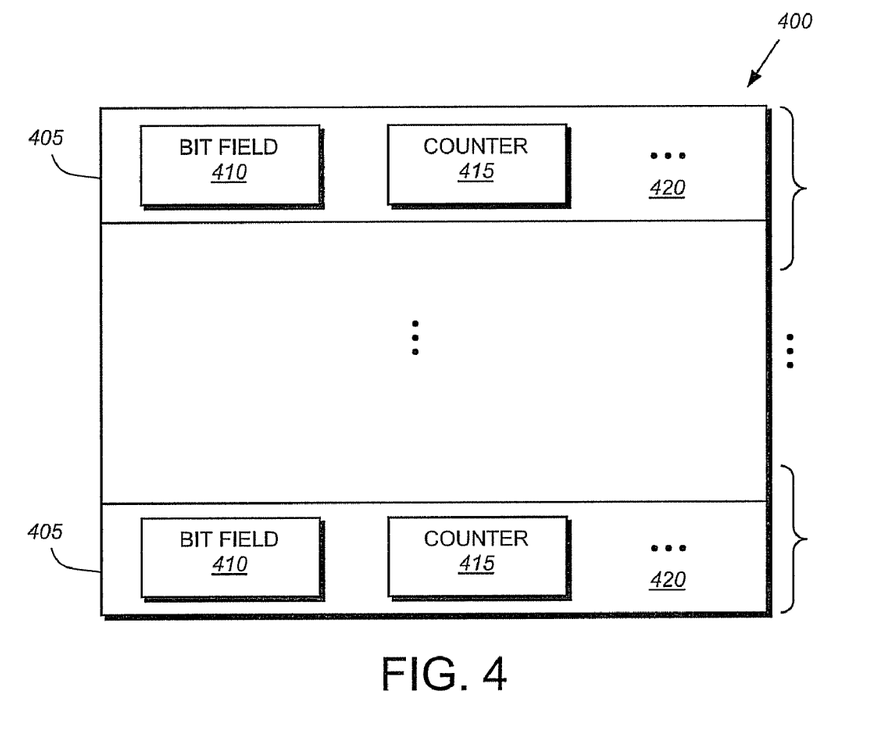
FIG. 4 is a schematic block diagram illustrating a block count reference file in accordance with an illustrative embodiment of the present invention.

The block reference count file 400, described further below in reference to FIG. 4, is utilized by the VTL module 260 for tracking the number of times each block within the block store 280 is referenced. When a particular block is reduced to having zero references to it, the block may be deleted from the block store, thereby freeing additional space.

C. Data De-Duplication

The present invention provides a system and method for eliminating duplicate data (de-duplication) using an electronic storage medium. In operation, a signature database and a block reference count data structure (e.g., a file) are stored on the electronic storage medium, such as a solid-state device within a storage system. The signature database maintains information about signatures (e.g., hashes) of data previously stored in data blocks on the storage system. The block reference count file maintains a count of the number of times a particular stored data block is referenced. That is, the block reference count file tracks the number of times that a particular block of data is referenced by de-duplicated data containers of the various data sets within the storage system. By storing these data structures in an electronic storage medium, access times are significantly improved over storage on a magnetic storage medium. Further, by managing the signature database and block reference count file in the electronic storage medium in accordance with the novel techniques of the present invention, the de-duplication system may perform operations at substantially real-time speed, thereby obviating the need for first storing the data prior to de-duplication.

Illustratively, a new data set, e.g., a backup data stream, is received by the storage system, e.g., a virtual tape library (VTL) system, implementing the invention, which chunks (divides) the data set into one or more data blocks. Illustratively, the blocks are is of a predetermined fixed size, e.g., 32 KB and a signature is generated of each block by, e.g., hashing the contents of the block. A determination is then made whether the generated signature has been stored previously in the signature database. If the signature has been stored in the signature database, the block is replaced in the data set with a pointer to the previously stored block. A counter in the block reference count file is then incremented. The block reference count file maintains an entry comprising a bit field and a counter for each of the blocks within the storage system. When a new reference to a particular block is added, the lowest clear bit within the bit field is asserted, e.g., set, in the entry associated with the block. Similarly, when a block is de-referenced, the highest clear bit of the bit field is set.

Should either of these operations set the last clear bit within the bit field, a repack operation is performed. The repack operation reads all entries within a region of the electronic storage medium. The counters are updated based on the recorded number of new references and/or de-references in the bit fields before the bit fields are cleared. The entries are then rewritten to the electronic storage medium. By utilizing a bit field counter with repack operations as necessary, the number of times that a particular region of an electronic storage medium needs to be rewritten is reduced, thereby increasing the life of the electronic storage medium.

Figure 3:
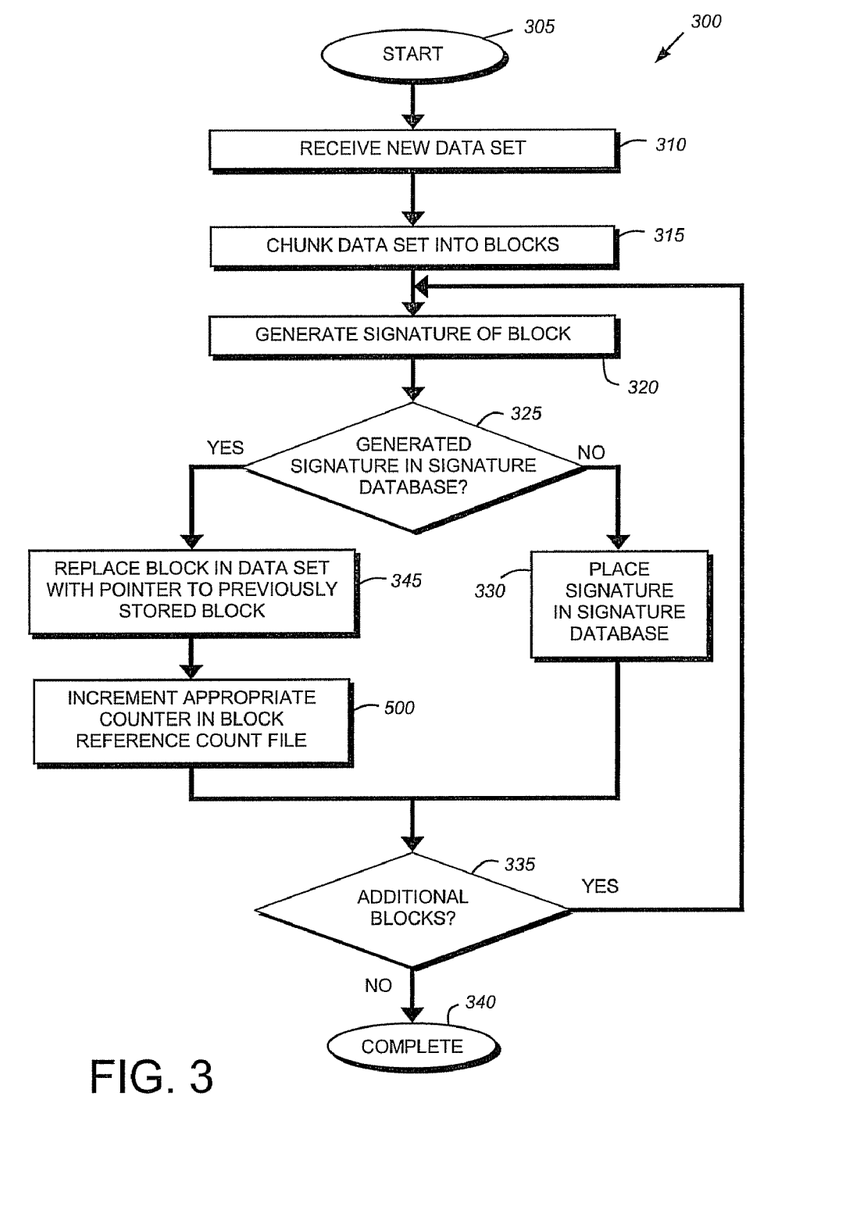
FIG. 3 is a flowchart detailing the steps of a procedure for performing de-duplication in substantially real time in accordance with an illustrative embodiment of the present invention.

FIG. 3 is a flowchart detailing the steps of a data de-duplication procedure 300 in accordance with an illustrative embodiment of the present invention. The procedure 300 begins in step 305 and continues to step 310 where a new data set is received by, e.g., the VTL system 200. In the illustrative environment 100 of FIG. 1, the received data set may comprise a new tape backup data stream directed to the VTL system 200 from the storage system 125. However, in alternative embodiments, any data set may be utilized on any computer including, for example, a file stored within the storage system 125. As such, the description of the data set being a tape backup data stream directed to a VTL system 200 should be taken as exemplary only. As noted, in alternative embodiments, any data set may be utilized on any computer. Thus, the teachings of the present invention may be utilized in environments different from the VTL system environment described herein.

In response to receiving the new data set, the VTL module 260 chunks (segments) is the data set into blocks in step 315. The VTL module 260 may chunk the data set using any acceptable form of data segmentation. In an illustrative embodiment, the VTL module chunks the data into fixed size blocks having a size of, e.g., 32 KB. However, it should be noted that in alternative embodiments additional and/or varying sizes may be utilized. Furthermore, the present invention may be utilized with other techniques for generating a blocks of data from the data set. As such, the description of utilizing fixed size blocks should be taken as exemplary only.

A signature of the block is then generated in step 320. Illustratively, the signature may be generated by hashing the data contained within the block and utilizing the resulting hash value as the signature. As will be appreciated by one skilled in the art, a strong hash function should be selected to avoid collisions, i.e., blocks having different contents hashing to the same hash value. However, it should be noted that in alternative embodiments differing techniques for generating a signature may be utilized. As such, the description of hashing the data in a block to generate the signature should be taken as exemplary only.

Once the signature of a block has been generated, the VTL module 260 determines whether the generated signature is located within the signature database 270 in step 325. This may be accomplished using, e.g., conventional hash table lookup techniques. If the signature is not stored within the signature database, the procedure 300 branches to step 330 where the VTL module loads the signature within the signature database. If the signature is not within the signature database, then the block associated with the signature has not been stored previously, i.e., this is the first occurrence of the block. In step 335, a determination is made whether additional blocks are within the data set. If so, the procedure 300 loops back to step 320 where the VTL module 260 generates the signature of the next block in the data set. Otherwise, the procedure 300 completes in step 340.

However, if the generated signature is located within the signature database 270, the VTL module 260 then replaces the block in the incoming data set with a pointer to a previously stored block in step 345. That is, the VTL module de-duplicates the data by replacing the duplicate data block with a pointer to the previously stored data block. For example, a data stream of ABA may be de-duplicated to AB<pointer to previously stored A>. As the size of the pointer is typically substantially smaller than the size of a block (typically by several orders of magnitude), substantial savings of storage space occurs. The VTL module then increments the appropriate counter in the block to reference counter file 400 in step 500, described further below in reference to FIG. 5.

The procedure 300 continues to step 335 to determine whether any additional blocks are in the data set. If there are no additional blocks in the data set, the procedure completes in step 335. However, if there are additional blocks, the procedure loops back to step 320.

FIG. 4 is a schematic block diagram of an exemplary block reference count file 400 in accordance with an illustrative embodiment of the present invention. The block reference count file 400 includes a plurality of entries 405. Each entry 405 is associated with a particular block of data stored within the block store 280. Each entry 405 illustratively comprises a bit field 410, a counter field 415 and, in alternative embodiments, one or more additional fields 420. The bit field, which is illustratively a 16-bit data structure, is utilized for tracking incremental changes in the number of times that a particular block is referenced, as described further below. The counter field 415 is utilized to store the number of times that a block is referenced in accordance with an illustrative embodiment of the present invention.

Electronic storage media typically have a finite number of times that a region of the media may be written. An illustrative embodiment of the present invention limits the number of times that a region containing portions of the block reference count file must be rewritten, thereby prolonging the operational life of the electronic storage media. Illustratively, when a new reference is added to a particular block, the lowest clear bit in the bit field 410 of the entry 405 is asserted, e.g., set. Similarly, when a reference is removed from a particular block, the highest clear bit in the bit field 410 of the entry 405 is set. By setting either the lowest clear bit or highest clear bit in the bit field, the number of times that a region containing portions of the block reference counter file needs to be rewritten is reduced. In accordance with an illustrative embodiment of the present invents tion, when the bit field 410 is filled, i.e., the last clear bit is set, a repack operation is performed that updates the counter field 415 and de-asserts, e.g., clears the bit field 410. Thus, by utilizing the setting of bits in the bit field as a counter, the useful life of the electronic storage medium is increased. For example, assuming a 16-bit bit field, a repack operation only needs to occur after every $16^{th}$ (de)reference operation directed to a particular block. As will be appreciated by one skilled in the art, alternative embodiments may increase the size of the bit field and reduce the frequency of repack operations but utilize additional electronic storage medium space, or bit fields may be reduced in size with a concomitant increase in frequency of repack operations.

Figure 5:
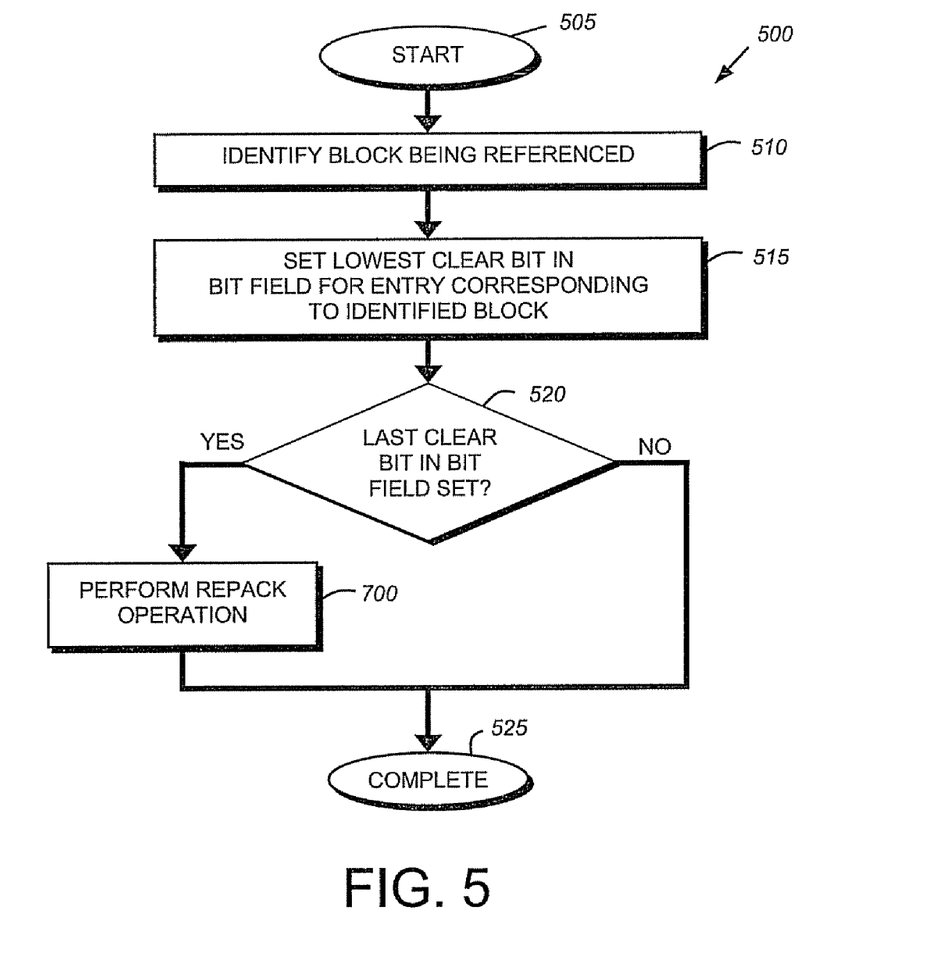
FIG. 5 is a flowchart detailing the steps of a procedure for updating a counter in the block reference count file in response to the addition of a reference in accordance with an illustrative embodiment of the present invention.

FIG. 5 is a flowchart detailing the steps of a procedure 500 for updating the block reference count file 400 in accordance with an illustrative embodiment of the present invention. The procedure 500 begins in step 505 and continues to step 510 where the block to which a new reference is being added is identified. Illustratively, a block is identified when an additional reference is added to the block. Thus, the first reference to a particular block is when the block is first stored and each time that the block is de-duplicated an additional reference is added to the block. In response, the lowest clear bit in the bit field 410 of the entry 405 corresponding to the identified block is set in step 515. A determination is then made in step 520 whether the bit that was set was the last clear bit in the bit field, i.e., whether all of the bits in the bit field 410 have now been set as a result of step 515. If so, the procedure 500 branches to step 700 and performs a repack operation 700, described further below in reference to FIG. 7, before completing in step 525. However, if the last clear bit in the bit field has not been set, then the procedure branches in step 520 and completes in step 525.

Figure 6:
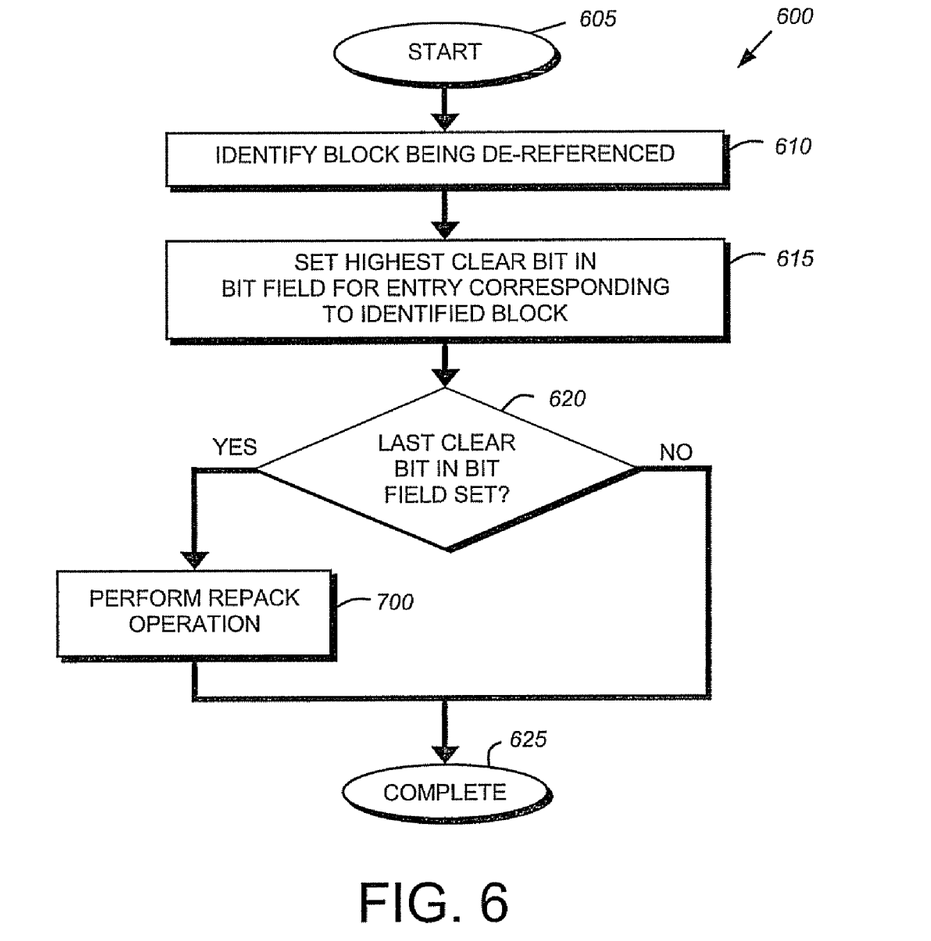
FIG. 6 is a flowchart detailing the steps of a procedure for updating a counter in the block reference count file in response to a block being de-referenced in accordance with an illustrative embodiment of the present invention.
Figure 7:
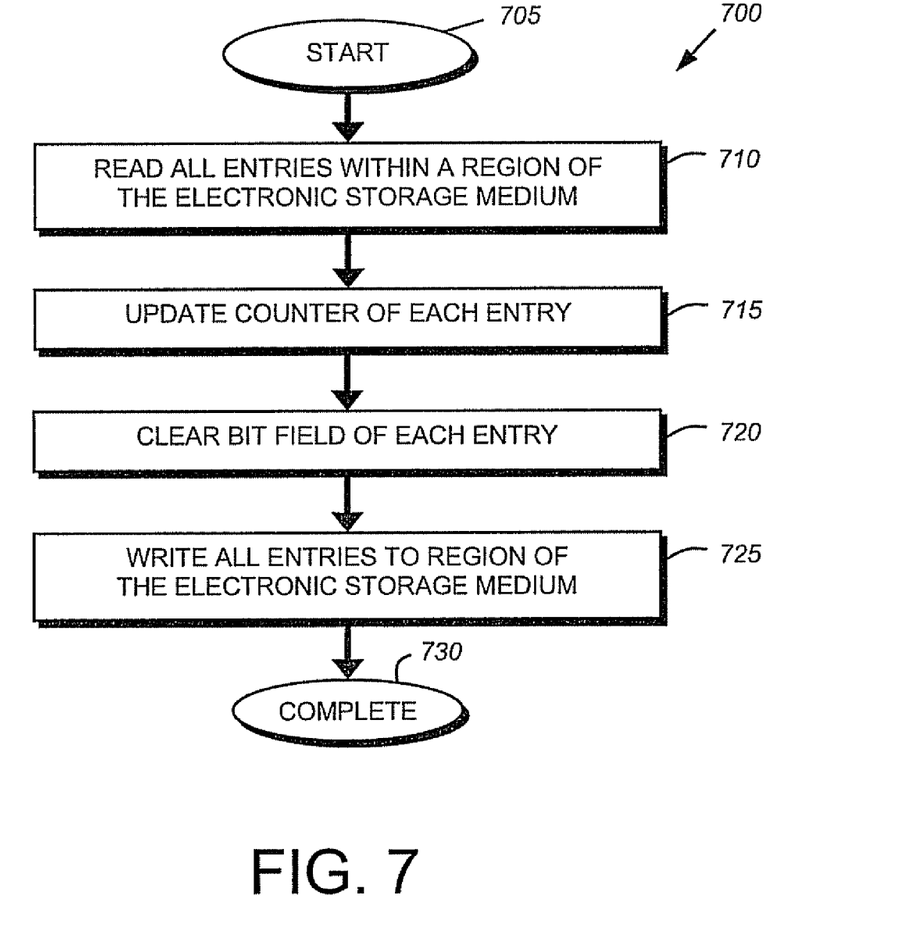
FIG. 7 is a flowchart detailing the steps of a procedure for performing a repack operation on an electronic storage medium in accordance with an illustrative embodiment of the present invention.

FIG. 6 is a flowchart detailing the steps of the procedure 600 for updating the block reference count file 400 in response to a block being de-referenced in accordance with an illustrative embodiment of the present invention. The procedure 600 begins in step 605 and continues to step 610 where the block being de-referenced is identified. A block may be de-referenced when an instantiation of the block is deleted. For example, a data set which contains the de-duplicated block may be deleted. Then, in step 615 the highest clear bit in the bit field 410 for the entry 405 corresponding to the identified block is set. A determination is then made in step 620 whether the last clear bit in the bit field has been set, i.e., whether all bits in the bit field are now set because of the operation of step 620. If so, then the procedure 600 branches to step 700 and performs a repack operation before completing in step 625. However, if in step 620 it is determined that the last clear bit has not been set in the bit field 410, then the procedure 600 branches to step 625 and completes.

FIG. 7 is a flowchart detailing the steps of a procedure 700 for performing a repack operation in accordance with an illustrative embodiment of the present invention. The procedure 700 begins in step 705 and continues to step 710 where all entries within a region of the electronic storage medium containing the appropriate entry are read. A region of an electronic storage medium may vary depending on the type of electronic storage medium. For example, a region of flash memory may comprise a flash memory block. Generally, a region comprises a meta area of the electronic storage medium such as a block, page, etc. Then, in step 715, the counter 415 for each entry 405 within the region is updated. That is, in step 715, the appropriate bit fields are reviewed as to the net number of increases or decreases in the number of references to a particular block. This result is then combined with the counter 415 to generate a new counter value. For example if the previous counter value was 10 and there were 12 additional references and four deletion of references, the new counter value would equal 18 (i.e., 10+12−4). The bit fields of each of the entries within the region are then cleared in step 720. The bit fields are cleared so that additional references and/or de-references may be tracked in accordance with an illustrative embodiment of the present invention. The data contained within the bit fields has been incorporated into the new counter values in step 715 above. As such, the bit fields may be cleared for reuse. All of the entries within the region are then written to the electronic storage medium in step 725. The procedure 700 completes in step 730.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can is be implemented as software, including a computer-readable medium having program instructions executing on a computer, hardware, firmware, or a combination thereof. Furthermore, it should be noted that while this description has been written in terms of VTL system, the teachings of the present invention are not so limited. The present invention may be utilized in any computer environment using any data store, including, e.g., a file system. Similarly, certain descriptions have been written in terms of setting or clearing a highest or lowest bit. As will be appreciated, such operations may be implemented using other techniques, e.g, vice versa and/or setting specific bits in place of a highest or lowest, etc. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
chunking a data set, received at a storage system, into at least one block;
generating a signature of one of the at least one blocks;
determining if the generated signature is stored in a signature database in an electronic storage medium of the storage system;
in response to determining that the generated signature is stored in the signature database, replacing the block associated with the generated signature with a pointer to a previously stored block associated with the signature stored in the signature database;
setting one of a lowest and a highest clear bit in a bit field associated with a counter in a block reference counter file stored in the electronic storage medium to indicate that an additional reference to the block has been made; and
setting one of a lowest and a highest clear bit in the bit field to indicate that a reference to the block has been deleted, whereby deduplication of the data set occurs in real time.

2. The method of claim 1 further comprising:
determining if additional blocks are to be processed; and
in response to determining that additional blocks are to be processed looping back to generating the signature.

3. The method of claim 1 wherein generating a signature of one of the at least one blocks comprises performing a hash function on the block.

4. The method of claim 1 wherein chunking the data set into at least one block comprises generating one or more fixed size blocks.

5. The method of claim 1 wherein the electronic storage medium comprises non-volatile random access memory.

6. The method of claim 1 wherein chunking, generating, determining, replacing, and incrementing are performed as the data set is entering the storage system in substantially real time.

7. The method of claim 1 wherein the storage system is a virtual tape library system.

8. The method of claim 1 wherein the electronic storage medium comprises flash memory.

9. The method of claim 1 wherein, in response to determining that a last free bit of the bit field was set, performing a repack operation thereby obviating a need to rewrite a region of the electronic storage medium in response after each update to the bit field.

10. The method of claim 9 wherein the repack operation comprises:
reading all entries within the region of the electronic storage medium;
updating a counter for each of the read entries;
clearing the bit field for each of the read entries; and
writing each of the read entries to the region of the electronic storage medium.

11. A system for real time deduplication of a data stream comprising:
a network;
a storage system coupled to the network; and
a virtual tape library coupled to the network and configured to receive the data stream transmitted over the network from the storage system in accordance with a backup operation, the virtual tape library further configured to generate a signature for each block of the data stream and to determine whether the generated signature is stored in a signature database within an electronic storage medium of the virtual tape library;
wherein the signature database comprises a plurality of entries each of which is associated with one signature, each entry comprising a counter field and a bit field wherein the counter field is utilized to store a count of a number of references to a block associated with the signature associated with the entry and wherein one of a lowest and a highest clear bit of the bit field is set to record an increase to the number of references since a last repack operation and one of a lowest and a highest clear bit is set to record a decrease to the number of references since the last repack operation.

12. The system of claim 11 wherein the virtual tape library is further configured, in response to determining that the generated signature is stored in the signature database, to replace the block in the data stream with a pointer to a previously stored block having the same signature.

13. A method comprising:
in response to adding a reference to a previously stored block setting one of a lowest and a highest clear bit in a bit field of an entry associated with a signature for the previously stored block and in response to removing a reference to the previously stored blocksetting one of a lowest and a highest clear bit in the bit field of the entry associated with the signature for the previously stored block, the entry stored in a signature database in an electronic storage medium of the storage system;

determining whether a last clear bit in the bit field is set; and in response to determining that the last clear bit in the bit field is set, performing a repack operation.

14. The method of claim 13 wherein the repack operation comprises:

reading all entries within a region of the electronic storage medium;

updating a counter for each of the read entries;

clearing a bit field for each of the read entries; and writing each of the read entries within the region to the electronic storage medium.

15. A computer program product for real time data deduplication of a data set comprising:

computer code, configured for execution on a storage system, that chunks the data set into at least one block;

computer code, configured for execution on a storage system, that generates a signature of one of the at least one blocks;

computer code, configured for execution on a storage system, that determines if the generated signature is stored in a signature database in an electronic storage medium of the storage system;

computer code, configured for execution on a storage system, that, in response to determining that the generated signature is stored in the signature database, replaces the block associated with the generated signature with a pointer to a previously stored block associated with the signature stored in the signature database;

computer code that sets one of a lowest and a highest clear bit in a bit field associated with a counter in a block reference counter file to indicate that an additional reference to the block has been made;

computer code that sets one of a lowest and a highest clear bit in the bit field to indicate that a reference to the block has been deleted; and a non-transitory computer readable medium that stores the computer codes.

16. The computer program product of claim 15 wherein the data set comprises a tape backup data stream.

17. The computer program product of claim 15 further comprising computer code, configured for execution on a storage system, that performs a repack operation.

\* \* \* \* \*

UNITED STATES PATENT AND TRADEMARK OFFICE
CERTIFICATE OF CORRECTION

PATENT NO. : 8,281,066 B1
APPLICATION NO. : 12/754162
DATED : October 2, 2012
INVENTOR(S) : Don Trimmer et al.

It is certified that error appears in the above-identified patent and that said Letters Patent is hereby corrected as shown below:

In the Specifications:

In col. 1, line 25 should read:
Which information may be obtained, as desired. The ~~is~~ storage In col. 1, line 58 should read:
Devices using a ~~is~~ plurality of disk drives. In typical VTL In col. 2, line 37 should read:
Accordance with the novel techniques of the ~~is~~ present inven- In col. 3, line 12 should read:
Environment including a ~~is~~ virtual tape library (VTL) system In col. 3, line 54 should read:
Operatively connected with the VTL system 200 ~~is~~ are one or In col. 4, line 28 should read:
And then performing a de-~~is~~ duplication operation on the pre- In col. 5, line 6 should read:
~~Structs tures~~structures. It will be apparent to those skilled in the art that In col. 6, line 22 should read:
Tively, the blocks are ~~is~~ of predetermined fixed size, e.g., 32

In col. 6, line 65 should read:
260 chunks (segments) ~~is~~ the data set into blocks in step 315.

Signed and Sealed this
Second Day of July, 2013

Teresa Stanek Rea
*Acting Director of the United States Patent and Trademark Office*

CERTIFICATE OF CORRECTION (continued)

U.S. Pat. No. 8,281,066 B1

In col. 8, line 15 should read:

Of the present ~~invents tion~~inventions, when the bit field 410 is filled, i.e, In col. 9, line 32 should read:

That the teachings of this invention can ~~is~~ be implemented as